United States Patent
Tonami

(10) Patent No.: US 8,115,963 B2
(45) Date of Patent: Feb. 14, 2012

(54) IMAGE PROCESSING APPARATUS, IMAGE PROCESSING METHOD, AND COMPUTER PROGRAM PRODUCT

(75) Inventor: Kazunari Tonami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 505 days.

(21) Appl. No.: 12/379,978

(22) Filed: Mar. 5, 2009

(65) Prior Publication Data
US 2009/0231647 A1 Sep. 17, 2009

(30) Foreign Application Priority Data

Mar. 17, 2008 (JP) .................................. 2008-068583
Dec. 8, 2008 (JP) .................................. 2008-312659

(51) Int. Cl.
*G06K 15/02* (2006.01)
(52) U.S. Cl. .......... 358/1.2; 358/1.1; 358/1.13; 358/527
(58) Field of Classification Search ................... 358/1.2, 358/1.13, 527; 382/282
See application file for complete search history.

(56) References Cited

U.S. PATENT DOCUMENTS

| | | | |
|---|---|---|---|
| 3,972,066 A * | 7/1976 | Seki et al. ..................... | 358/527 |
| 6,977,757 B1 | 12/2005 | Takahashi et al. | |
| 7,106,476 B1 | 9/2006 | Tonami et al. | |
| 7,142,330 B2 | 11/2006 | Takahashi et al. | |
| 7,251,060 B2 | 7/2007 | Tonami et al. | |
| 2002/0048413 A1 * | 4/2002 | Kusunoki ...................... | 382/282 |
| 2004/0125411 A1 | 7/2004 | Tonami et al. | |
| 2004/0257622 A1 | 12/2004 | Shibaki et al. | |
| 2004/0257625 A1 | 12/2004 | Tonami | |
| 2005/0206930 A1 | 9/2005 | Tonami | |
| 2007/0092151 A1 | 4/2007 | Takahashi et al. | |
| 2009/0066986 A1 * | 3/2009 | Miyagi et al. ................ | 358/1.13 |

FOREIGN PATENT DOCUMENTS

| | | |
|---|---|---|
| JP | 2004-240200 | 8/2004 |
| JP | 2006-203702 | 8/2006 |

* cited by examiner

*Primary Examiner* — Twyler Haskins
*Assistant Examiner* — Helen Q Zong
(74) *Attorney, Agent, or Firm* — Harness, Dickey & Pierce, P.L.C.

(57) ABSTRACT

An image processing apparatus includes a receiving unit that receives a display request for displaying a preview image of gradation-processed image data, and a preview magnification indicative of a display magnification of the preview image. An image processing unit performs a first magnification-altering process on the gradation-processed image data performs the gradation process based on the image quality mode if the preview magnification is lower than a present magnification and the gradation process based on the image quality mode is such that the gradation-processed image data does not express halftone, as well as if the preview magnification is higher than the present magnification thereby obtaining processed image data. A display unit creates and displays the preview image based on the processed image data.

18 Claims, 6 Drawing Sheets

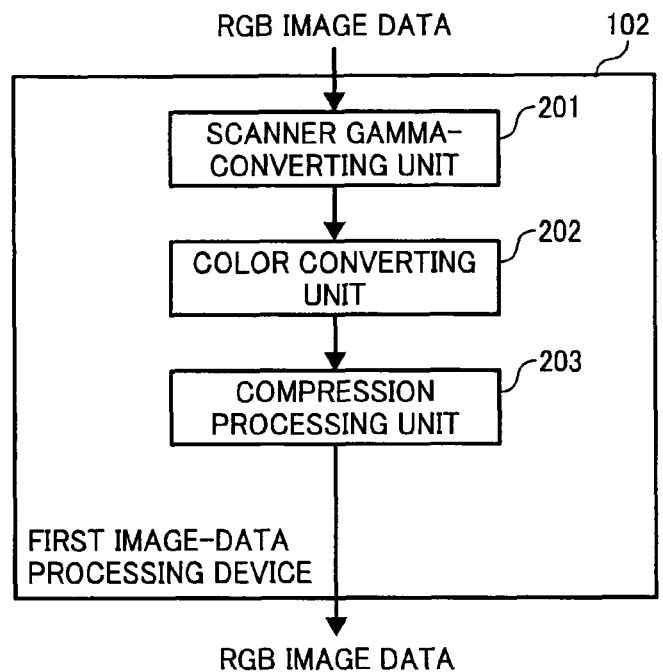
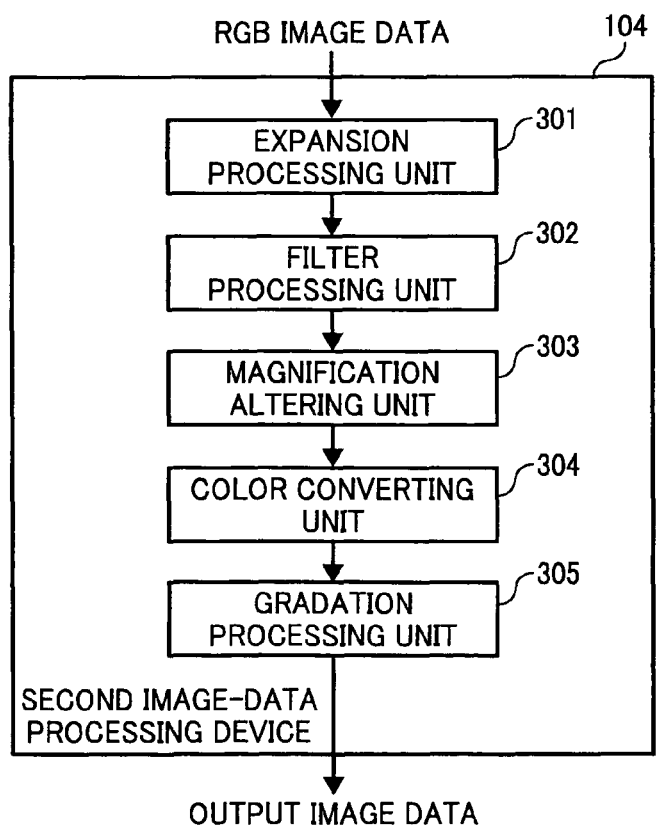

FIG. 4

| IMAGE QUALITY MODE | | GRADATION PROCESS OF OUTPUT IMAGE | GRADATION PROCESS OF LOW-MAGNIFICATION PREVIEW IMAGE | GRADATION PROCESS OF HIGH-MAGNIFICATION PREVIEW IMAGE |
|---|---|---|---|---|
| FULL COLOR/GRAYSCALE | | MULTIVALUED IMAGE | MULTIVALUED IMAGE | MULTIVALUED IMAGE |
| MONOCHROMATIC TWO-VALUE (PICTURE MODE) | MONOCHROMATIC TWO-VALUE IMAGE | ERROR DIFFUSION/ DITHER | MULTIVALUED IMAGE | ERROR DIFFUSION/ DITHER |
| MONOCHROMATIC TWO-VALUE (TEXT MODE) | | PLAIN BINARIZATION | PLAIN BINARIZATION | PLAIN BINARIZATION |

FIG. 8
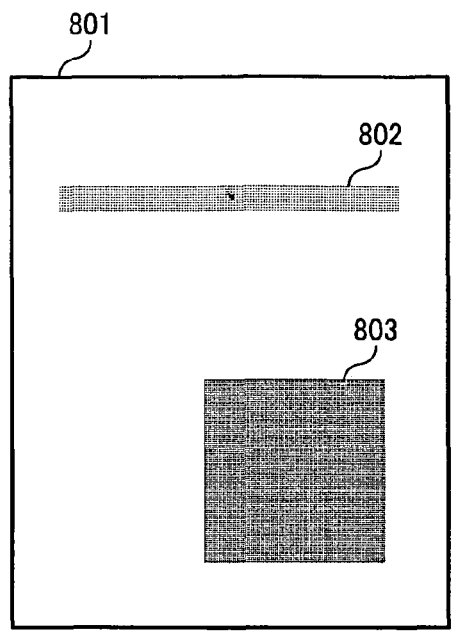
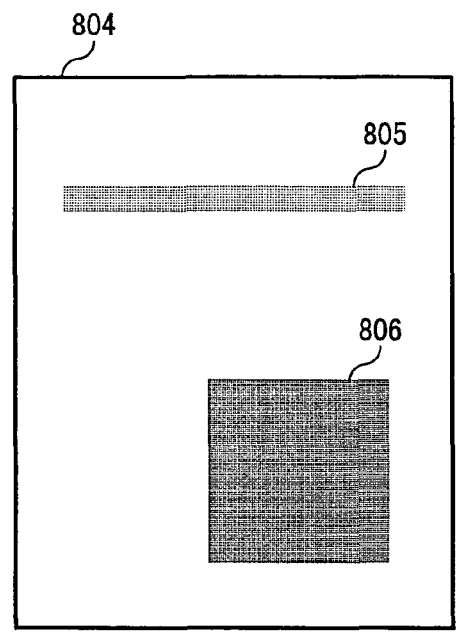
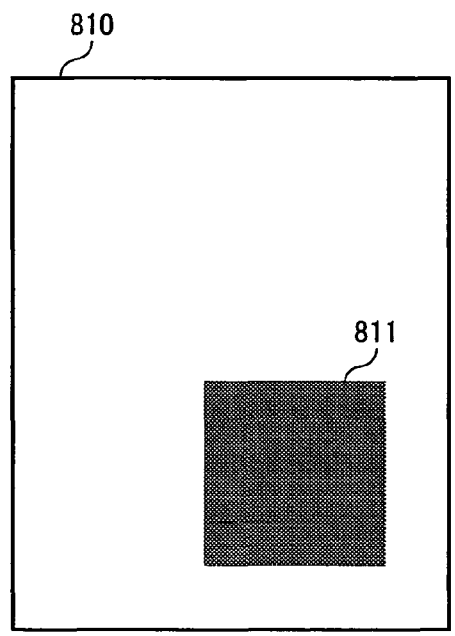
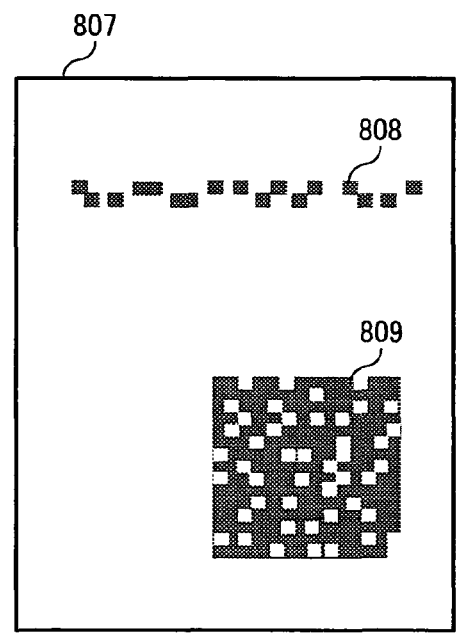

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-068583 filed in Japan on Mar. 17, 2008 and Japanese priority document 2008-312659 filed in Japan on Dec. 8, 2008.

BACKGROUND OF THE INVENTION

1. Field of the Invention

The present invention relates to an image processing apparatus, an image processing method, and a computer program product.

2. Description of the Related Art

Most digital multifunction peripherals (MFP) that are available in the market today have a preview-image display function (hereinafter, "preview function"). In the preview function, image data are displayed on a liquid crystal display (LCD) of a control panel or a screen of a host personal computer (PC). The preview function allows a user to check an image prior to printing it or transmitting it to some other device via a network.

The preview function usually has a magnification altering function that allows an image to be displayed in its entirety or parts thereof displayed in different magnifications. Specifically, the magnification altering function allows the user to view the entire image shrunk to fit in the LCD of the control panel or the screen of the host PC so that the user can get an idea about the image or its density, as well as to view a magnified image of a portion of the image on the LCD of the control panel or the screen of the host PC so that the user can check the details such as whether a minute text in the image is clear or whether a line in the image is intact.

A preview image creation technology is disclosed in Japanese Patent Application Laid-open No. 2006-203702 by which preview images of image data stored in a hard disk are created using the preview function that includes the magnification altering function. In the preview image creating technology, a maximum-resolution preview image is first created in the highest possible resolution that can be selected by the user, and then a preview image is created in the magnification selected by the user based on the maximum-resolution preview image.

When distributing an image data of a scanned image of an original over the network, the digital MFP takes into consideration the type and the file size of the original for performing a gradation process on the scanned image data before sending the image data over the network. For example, a multivalued image data can be distributed as it is, or as a binary image by subjecting the image to a pseudo halftone process, such as an error diffusion process and a dither process, or as a binary image by only subjecting the image to a binarization process. A gradient of the image and text reproduction of the image data that is subjected to a gradation process and an image data that is not subjected to a gradation process are completely different. Therefore, if an image data is subjected to a gradation process before it is distributed over the network, it is preferable that a gradation expression method is the same for the preview image and the output image data.

However, conventionally, the preview images created are of the image data that are subjected only to a magnification process. Therefore, when the image is output after it is subjected to a gradation process, such as pseudo halftone process or a plain binarization, even if preview images of the magnified image are displayed, the gradient of the image and the text reproduction of the output image are altogether different from what is apparent from the preview images. Thus, the user cannot really get an idea about the actual image from the preview image.

SUMMARY OF THE INVENTION

It is an object of the present invention to at least partially solve the problems in the conventional technology.

According to an aspect of the present invention, there is provided an image processing apparatus including an output unit that outputs gradation-processed image data that has been subjected to a gradation process based on preset image quality mode; a receiving unit that receives a display request for displaying a preview image of the gradation-processed image data to be output from the output unit, and a preview magnification indicative of a display magnification of the preview image; an image processing unit that performs a first magnification-altering process on the gradation-processed image data output from the output unit thereby obtaining magnification-altered image data and performs on the magnification-altered image data the gradation process based on the image quality mode if the preview magnification is lower than a present magnification and the gradation process based on the image quality mode is such that the gradation-processed image data does not express halftone, as well as if the preview magnification is higher than the present magnification thereby obtaining processed image data; and a display unit that creates and displays the preview image based on the processed image data.

According to another aspect of the present invention, there is provided an image processing method including outputting gradation-processed image data that has been subjected to a gradation process based on preset image quality mode; receiving a display request for displaying a preview image of the gradation-processed image data to be output from the output unit, and a preview magnification indicative of a display magnification of the preview image; first performing including performing a first magnification-altering process on the gradation-processed image data output at the outputting thereby obtaining magnification-altered image data, and performing on the magnification-altered image data the gradation process based on the image quality mode if the preview magnification is lower than a present magnification and the gradation process based on the image quality mode is such that the gradation-processed image data does not express halftone, as well as if the preview magnification is higher than the present magnification thereby obtaining processed image data; and creating and displaying the preview image based on the processed image data.

According to still another aspect of the present invention, there is provided a computer program product that includes a computer program stored on a computer-readable storage medium which when executed on a computer causes the computer to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram of a first image-data processing device illustrated in FIG. 1;

FIG. 3 is a block diagram of a second image-data processing device illustrated in FIG. 1;

FIG. 4 is a tabular representation of gradation processes performed based on different image quality modes;

FIG. 8 depicts examples of high-magnification preview images.

DETAILED DESCRIPTION OF THE PREFERRED EMBODIMENTS

Exemplary embodiments according to the present invention are explained below with reference to the accompanying drawings. The embodiments of the present invention are implemented on a multifunction peripheral (MFP). However, the embodiments of the present invention can be implemented on any image processing apparatus such a printer, a facsimile machine, a scanner, or a copier.

Figure 1:
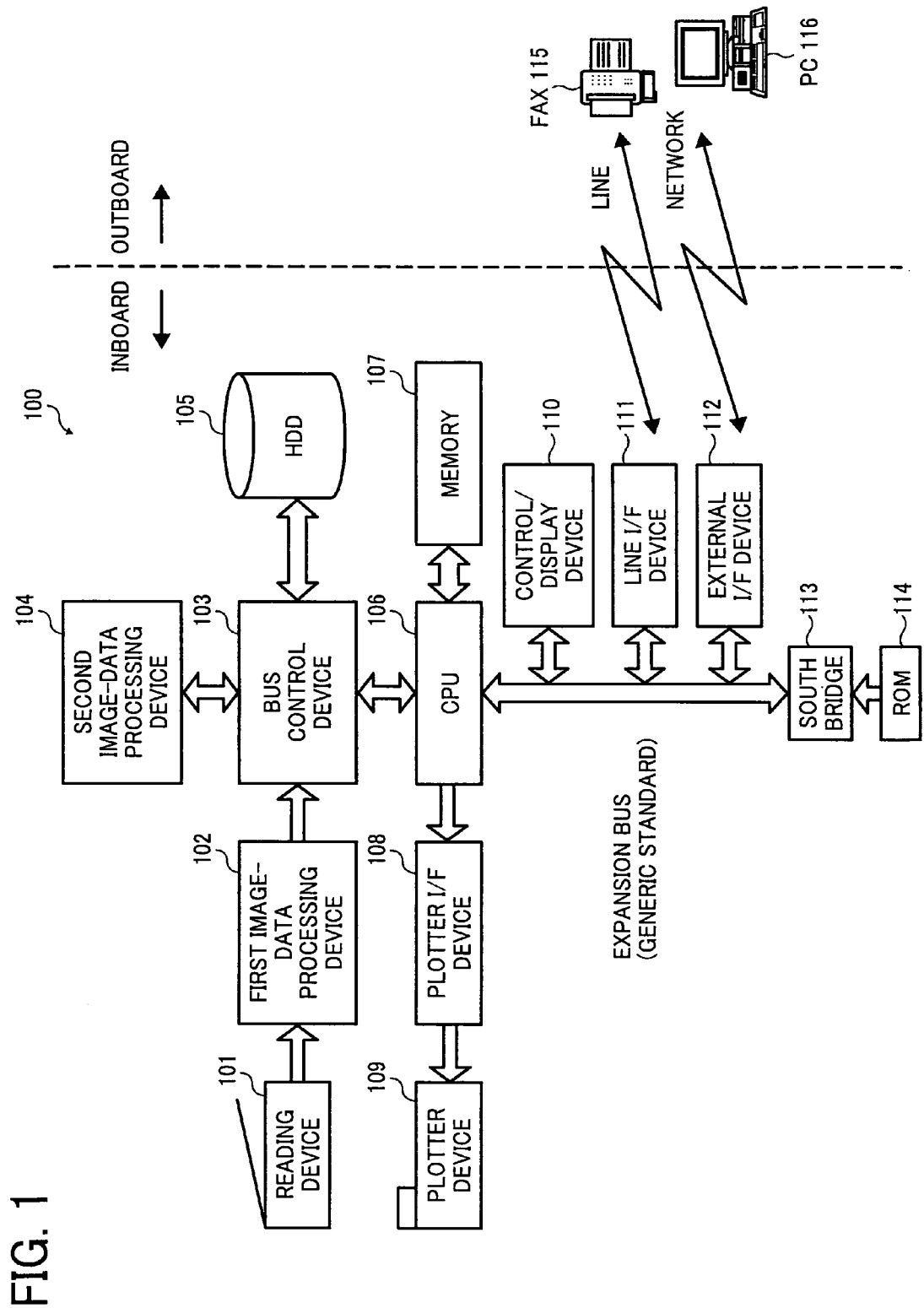
FIG. 1 is a block diagram of a multifunction peripheral (MFP) according to an embodiment of the present invention.

FIG. 1 is a block diagram of an MFP 100 according to an embodiment of the present invention. The MFP 100 includes a reading device 101 that functions as an image input unit, a first image-data processing device 102, a bus control device 103, a second image-data processing device 104, a hard disk drive (HDD) 105 that functions as a storage unit for storing image data, a central processing unit (CPU) 106 that performs overall control of the MFP 100, a memory 107, a plotter interface (I/F) device 108, a plotter device 109 that produces a print output of the image data, a control/display device 110 that functions as a function selection unit for a user to select a function for the image data, a line I/F device 111 that performs data exchange of image data between the MFP 100 and a fax 115 that is an external device, an external I/F device 112 and a south bridge 113 that perform exchange of image data between the MFP 100 and a personal computer (PC) 116 that is an external device over a network, and a read-only memory (ROM) 114.

The line I/F device 111 connects the MFP 100 and the fax 115 via a telephone line and facilitates exchange of image data between the two.

The external I/F device 112 connects the MFP 100 and the PC 116 via the network such as Ethernet (registered trademark) and facilitates input and output of control data and image data.

The south bridge 113 functions as a bridge between various buses.

The plotter I/F device 108 receives a four-color CMYK (cyan (C), magenta (M), yellow (Y), and black (K)) image from the CPU 106, and outputs the image to a dedicated interface of the plotter device 109.

The plotter device 109 performs an electrophotographic process using a laser beam on the CMYK image received from the plotter I/F device 108, and outputs the image to a transfer sheet.

The control/display device 110 functions as an interface between the MFP 100 and the user, and includes a liquid crystal display (LCD) that displays the various statuses of the MFP 100 and screens for urging the user to select operation methods, and a switch group that detects commands input by the user.

The LCD is capable of displaying preview images for the user to get an idea about the image data output from the plotter device 109, the fax 115, or the PC 116.

The switch group includes a key switch each for preview-image display request (hereinafter, "preview switch"), entering a preview magnification (or resolution of the preview image (hereinafter, "magnification input switch"), specifying a color mode (for example, monochromatic) of the image data to be output (hereinafter, "color-mode input switch"), specifying an image quality mode of the image data to be output (hereinafter, "image-quality mode input switch"), and a numeric keypad for specifying a predetermined magnification which will be used as a criterion for deciding whether the preview magnification in which the preview image is displayed is a low-magnification preview.

The reading device (scanner) 101 creates an 8-bit image data each of red (R), green (G), and blue (B) from shading data of an original obtained by scanning the original at a resolution of 600 dots-per-inch (dpi), and outputs the image data to the first image-data processing device 102.

The first image-data processing device 102 performs necessary image processing on the image data received from the reading device 101, and outputs the resulting image to the bus control device 103.

A configuration of the first image-data processing device 102 is explained below with reference to FIG. 2. FIG. 2 is a block diagram of the first image-data processing device 102. The first image-data processing device 102 includes a scanner gamma-converting unit 201, a color converting unit 202, and a compression processing unit 203.

The scanner gamma-converting unit 201 performs gamma conversion on the 8-bit image data of each of the colors RGB, matches gray balance, and alters the gradient.

The color converting unit 202 converts the image data obtained after gamma conversion to an RGB image data of a color space of predetermined characteristics. Adobe (registered trademark) RGB color space is an example of the color space of predetermined characteristics.

The compression processing unit 203 subjects the RGB data obtained after the color conversion process to a compression process. The compression method used in the compression process can be Joint Photographic Experts Group (JPEG) compression, which is a lossy compression method.

The RGB image data (multivalued gradient image) thus created by the first image-data processing device 102 is stored in the HDD 105 via the bus control device 103.

The bus control device 103 controls data bus via which the image data and control commands are exchanged between the functional units of the MFP 100.

The HDD 105 is a high-capacity storage device that stores therein the image data read by the reading device 101, the RGB image data obtained after image processing by the first image-data processing device 102 or digital image data obtained after image processing by the second image-data processing device 104, and auxiliary data thereof.

The second image-data processing device 104 performs necessary image processing on the image data obtained after image processing by the first image-data processing device 102 or the image data read from the HDD 105, and outputs the resulting image data to the bus control device 103.

A configuration of the second image-data processing device 104 is explained below with reference to FIG. 3. FIG. 3 is a block diagram of the second image-data processing device 104. The second image-data processing device 104 includes an expansion processing unit 301, a filter processing unit 302, a magnification altering unit 303, a color converting unit 304, and a gradation processing unit 305.

The expansion processing unit 301 subjects the RGB image data obtained after the compression process by the first image-data processing device 102 to an expansion process.

The filter processing unit 302 performs smoothing to enhance the edges of the image data or for noise removal according to the image data specified using the image-quality mode input switch. For example, if a text mode is specified using the image-quality mode input switch, the filter processing unit 302 performs a sharpness process to make the text stand out, and if a picture mode is specified using the image-quality mode input switch, the filter processing unit 302 performs smoothing to express a smooth gradient.

The magnification altering unit 303 changes the magnification of the image data to the specified resolution. Apart from accepting the request for preview image display via the preview switch, the magnification altering unit 303 changes the preview magnification (resolution) of the image data if the preview magnification (or resolution) specified via the magnification input switch is lower than a preset magnification.

The color converting unit 304 converts the 8-bit RGB image data to an image data of the color space suitable for the output (transfer) destination. Specifically, if the image data is to be output to the plotter device 109, the color converting unit 304 converts the image data to the 8-bit image data of each of the colors CMYK, which is the color space of the plotter device 109. If the plotter device 109 can outputs only monochrome images, the color converting unit 304 converts the image data such that only K (black) signals are output. Further, when sending the image data to the fax 115 via the line I/F device 111 or to the PC 116 on the network via the external I/F device 112, the color converting unit 304 converts the 8-bit RGB image data to an image data of standard RGB (sRGB) color space or to the 8-bit gradient image data.

The gradation processing unit 305 performs a gradation process on the 8-bit CMYK image data, sRGB image data, and the 8-bit grayscale image data obtained after the color conversion process by the color converting unit 304.

Specifically, if the image data is to be output to the plotter device 109, the gradation processing unit 305 performs a pseudo halftone process such as a dither process or an error diffusion process on the image data and converts the image data to an image data of a gradient number of the plotter device 109 (for example, 3-bit image data of each of the colors CMYK).

If the image data is to be output to the fax 115 or the PC 116, the gradation processing unit 305 performs the gradation process on the image data based on the image quality mode specified by the user via the image-quality mode input switch. The user can specify via the image-quality mode input switch any of three image quality modes, namely, full color/grayscale distribution mode, monochromatic two-value distribution (picture mode), and monochromatic two-value distribution (text mode).

For example, if the user specifies the full color/grayscale distribution mode, the gradation processing unit 305 outputs a multivalued (gradient) sRGB image data or the 8-bit grayscale image data (in other words, the gradation processing unit 305 outputs the image data without subjecting it to any gradation process). If the user specifies the monochromatic two-value distribution (picture mode), the gradation processing unit 305 performs on the grayscale image data, the error diffusion process or the dither process, which is a process performed based on the monochromatic two-value distribution (picture mode), and outputs a 1-bit image data. If the user specifies the monochromatic two-value distribution (text mode), the gradation processing unit 305 performs on the grayscale image data, a plain binarization, which is a process performed based on the monochromatic two-value distribution (text mode), and outputs the 1-bit image data. Further, if the user specifies the monochromatic two-value distribution (text mode), the gradation processing unit 305 performs plain binarization. However, the gradation processing unit 305 can be configured to perform any gradation process whereby a resulting image data does not express halftone.

Thus, the image data created by the second image-data processing device 104 is printed on a printing paper by the plotter device 109, sent to the fax 115 via the line I/F device 111, or sent to the PC 116 via the external I/F device 112

Further, apart from accepting the request for preview image display via the preview switch, if a preview magnification is specified by the user via the magnification input switch, the gradation processing unit 305 determines whether the preview magnification specified by the user is lower than a preset magnification specified via the numeric keypad (that is, whether a low-magnification preview is specified). If a low-magnification preview is specified and the gradation process based on the image quality mode specified by the user via the image-quality mode input switch is plain binarization, as well as if a preview magnification that is higher than the preset magnification is specified, the gradation processing unit 305 subjects the image data to a gradation process based on the image quality mode specified by the user via the image-quality mode input switch.

FIG. 4 is a tabular representation of the gradation processes performed based on different image quality modes. The table shown in FIG. 4 contains, in an associated form, the image quality modes specified via the image-quality mode input switch, the gradation processes performed on the image data corresponding to the image quality modes, the gradation processes performed on the image data for displaying a preview image of low magnification (that is, in case the resolution is lower than that specified via the numeric keypad), as well as the gradation processes performed on the image data for displaying a preview image of high magnification (that is, in case the resolution is higher than that specified via the numeric keypad).

For example, if full color/grayscale distribution mode is specified as the image quality mode, the gradation processing unit 305 outputs the image data, a low-magnification preview image, and a high-magnification preview image.

If monochromatic two-value (picture mode) is specified as the image quality mode, the gradation processing unit 305 performs on the image data, a gradation process to output a monochromatic two-value image (that is, error diffusion process/dither process). If monochromatic two-value (picture mode) is specified as the image quality mode, and if the image data is a low-magnification preview image, the gradation processing unit 305 outputs a multivalued gradient image data. If monochromatic two-value (picture mode) is specified as the image quality mode, and the image data is a high-magnification preview image, the gradation processing unit 305 performs error diffusion process/dither process on the image data.

If monochromatic two-value (text mode) is specified as the image quality mode, the gradation processing unit 305 performs on the image data, a gradation process to output a monochromatic two-value image (that is, plain binarization). If monochromatic two-value (text mode) is specified as the image quality mode, the gradation processing unit 305 performs plain binarization for both the low-magnification preview image and the high-magnification preview image.

The CPU 106 is a microprocessor that performs the overall control of the MFP 100.

The memory 107 is a volatile memory that temporarily stores therein computer programs and data of intermediate processes when the CPU 106 is performing the overall control of the MFP 100.

The ROM 114 functions as a storage medium, and stores therein the computer programs required by the CPU 106 for controlling the MFP 100.

Apart from the ROM 114, other storage media like optical disks such as a compact disk (CD)-ROM and a digital versatile disk (DVD), magnetic disks such as a magneto optical disk and a flexible disk, and a semiconductor memory can also be used as the storage medium. Alternatively, the computer program can be downloaded from a network such as the Internet via the external I/F device 112 and installed on the HDD 105. In this case, the storage device on the source server in which the computer program is stored is also recognized as the storage medium in the present invention. The computer program can be something that runs on a designated operating system (OS), wherein the OS can be made responsible for execution of some of the processes explained later. Alternatively, the computer program can be included as a part of a group of program files of designated application software or the OS.

The CPU 106 executes various processes based on the computer program stored in the ROM 114 that serves as a main memory device of the MFP 100.

An image processing program, which is stored in the ROM 114 of the MFP 100, causes the CPU 106 to execute, among other functions, a salient function of the MFP 100. The salient function of the MFP 100 is explained next.

To explain the salient function of the MFP 100 simply, the MFP 100 performs a gradation process on the image data at output, and when creating a preview image from the image data, changes the gradation process to be performed on the image data based on the preview magnification and the image quality mode. By doing so, the MFP 100 creates a preview image that looks more like the actual image data, enabling the user to get an idea about the output image data from the preview image.

Figure 5:
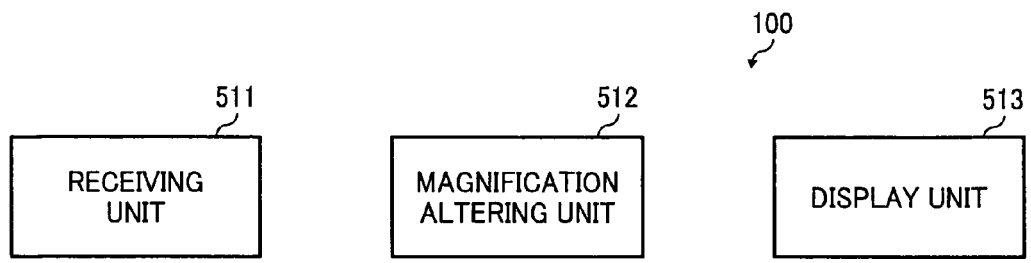
FIG. 5 is a functional block diagram of the MFP shown in FIG. 1.
Figure 6:
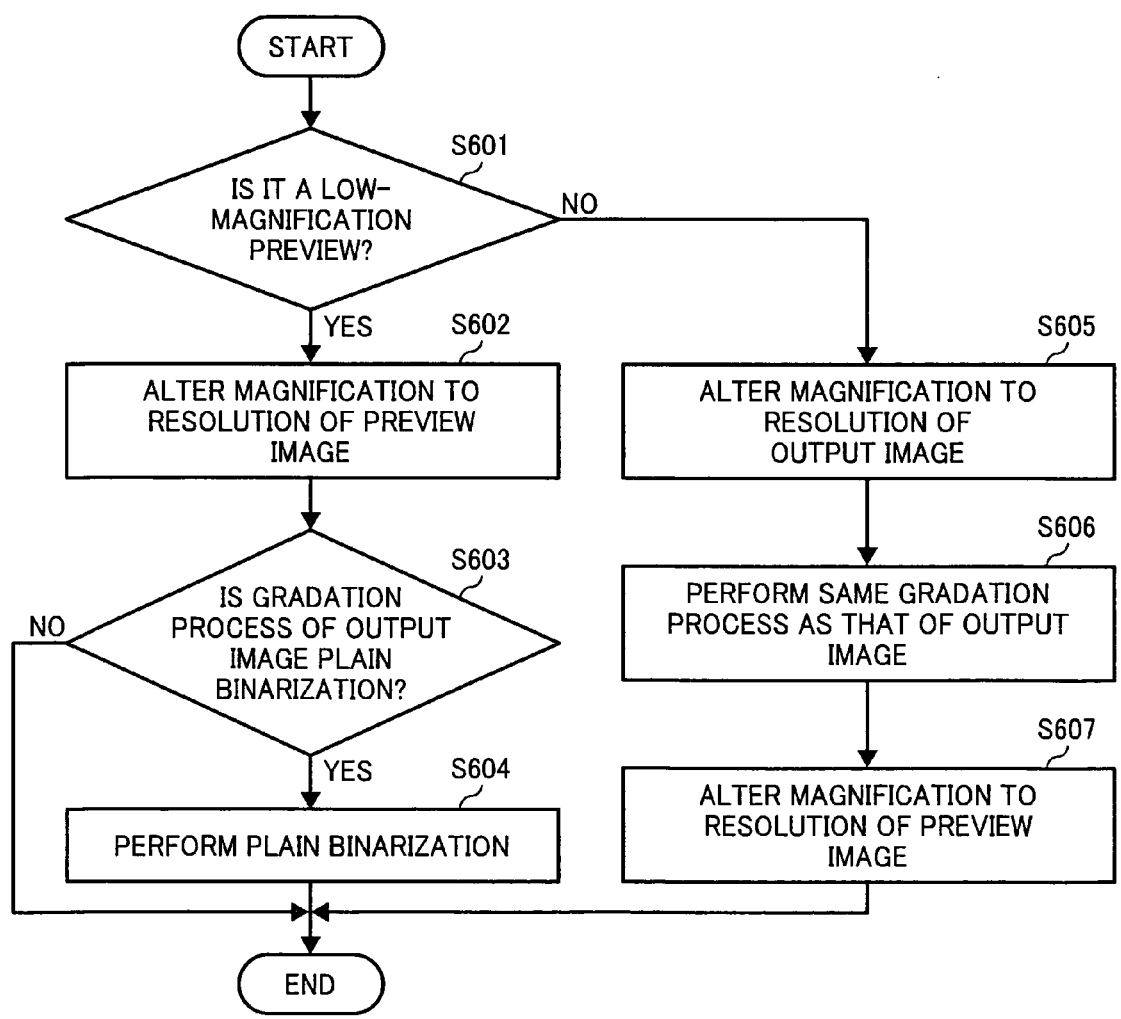
FIG. 6 is a flowchart of a preview-image creation process performed by the second image-data processing device.

The salient function of the MFP 100 is explained below with reference to FIGS. 5 and 6. FIG. 5 is a functional block diagram of the MFP 100. FIG. 6 is a flowchart of a preview-image creation process performed by the second image-data processing device 104. As shown in FIG. 5, the MFP 100 includes a receiving unit 511, a magnification altering unit 512, and a display unit 513, consistent with the image processing program.

The receiving unit 511 receives a preview-image display request via the preview switch of the control/display device 110, and issues a command to the second image-data processing device 104 to commence the preview-image creation process.

Upon receiving the command from the receiving unit 511, the second image-data processing device 104 creates a preview image based on the image data stored in the HDD 105. If, after viewing the preview image, the user issues an image-data output command, the second image-data processing device 104 performs image processing on the image data stored in the HDD 105, and creates the output image data. Thus, irrespective of whether or not preview image is to be created, the first image-data processing device 102 performs image processing on the image data created by the reading device 101, and stores the processed image data in the HDD 105.

Along with the preview-image display request via the preview switch, the receiving unit 511 also receives the specification of the preview magnification (resolution) via the magnification input switch, and conveys the preview magnification to the second image-data processing device 104. In the embodiment, the preview magnifications acceptable by the receiving unit 511 are 25%, 50%, 100%, and 200%. The user can enter the preview magnification by using the magnification input switch of the control/display device 110. The user can specify any preview magnification between 25% and 200%, and for example, specify preview magnification in increments of 1%.

The receiving unit 511 also receives the color mode specified via the color-mode input switch, the image quality mode specified via the image-quality mode input switch, and a preset magnification specified via the numeric keypad, and conveys the color mode, the image quality mode, and the preset magnification to the second image-data processing device 104.

The receiving unit 511 receives the preset magnification from the numeric keypad and conveys the same to the second image-data processing device 104. Image processing of the image data takes a long time if a high-magnification preview image is to be created. However, the MFP 100 allows the user to decide whether long processing time is acceptable for creation of the high-magnification preview image.

Upon receiving the command to commence the preview-image creation process from the receiving unit 511, the expansion processing unit 301 and the filter processing unit 302 of the second image-data processing device 104 perform an expansion process on the image data as well as a smoothing process based on the image quality mode conveyed by the receiving unit 511. Among the processes performed by the second image-data processing device 104, the processes (like the expansion process, filtering process, and color conversion) performed by the functional units other than the magnification altering unit 303 and the gradation processing unit 305 are not explained in detail because they are identical to the processes the image data is subjected to at output.

The magnification altering unit 303 of the second image-data processing device 104 compares the preview magnification and the preset magnification conveyed by the receiving unit 511 to determine whether it is a low magnification preview (Step S601). It is assumed that the preset magnification is 80%, based on which the magnification altering unit 303 determines whether it is a low-magnification preview. For example, if the preview magnification conveyed by the receiving unit 511 is 25% or 50%, the magnification altering unit 303 determines that it is a low-magnification preview. If the preview magnification conveyed by the receiving unit 511 is 100% or 200%, the magnification altering unit 303 determines that it is a high-magnification preview.

The magnification altering unit 303 performs a magnification altering process on the image data based on the outcome of the determination whether it is a low-magnification preview.

The magnification altering process performed by the magnification altering unit 303 when a low-magnification preview is specified is explained next.

If the preview magnification conveyed by the receiving unit 511 is lower than the preset magnification (Yes at Step S601), the magnification altering unit 303 alters the magnification of the image data to a resolution (preview image resolution) based on the preview magnification conveyed by the receiving unit 511 (Step S602). For example, if the preview magnification conveyed by the receiving unit 511 is 25%, and the resolution of the image data stored in the HDD 105 is 600 dpi, the magnification altering unit 303 alters the magnification of the image data to 150 dpi (600×25%). The color converting unit 304 performs on the magnification-altered image data the color conversion process based on the color mode conveyed by the receiving unit 511.

If it is a low-magnification preview based on the comparison of the preview magnification and the preset magnification conveyed by the receiving unit 511, the gradation processing unit 305 determines whether the gradation process to be performed on the image data at output (in other words, the gradation process to be performed based on the image quality mode conveyed by the receiving unit 511) is plain binarization (Step S603). If the gradation process performed on the image data at output is a multi-value (gradient) image output or the pseudo halftone process (No at Step S603), the gradation processing unit 305 outputs an image data expressed by a multivalued (gradient) image. If the gradation process to be performed on the image data at output is plain binarization (Yes at Step S603), the gradation processing unit 305 subjects the image data to plain binarization (Step S604).

The gradation processing unit 305 refers to the image quality modes and the associated gradation processes performed on the image data at output shown in the table in FIG. 4, and determines the gradation process to be performed on the image data at output by determining whether the gradation process based on the image quality mode conveyed by the receiving unit 511 is plain binarization.

For example, if monochromatic two-value (text mode) is conveyed as the image quality mode by the receiving unit 511, the gradation processing unit 305 subjects the magnification-altered image data to plain binarization because in the table shown in FIG. 4, the gradation process associated with the image quality mode monochromatic two-value (text mode) is plain binarization. Thus, the gradation processing unit 305 subjects the magnification-altered image data to the same gradation process (plain binarization) as the image data is subjected to at output.

If monochromatic two-value (picture mode) is conveyed as the image quality mode by the receiving unit 511, the gradation processing unit 305 outputs the magnification-altered image data (the image data expressed by multivalued (gradient) image) without performing the gradation process (error diffusion/dither process (pseudo halftone process)) because in the table shown in FIG. 4, the gradation process associated with the image quality mode monochromatic two-value (picture mode) is not plain binarization (but is error diffusion/dither process (pseudo halftone process)).

If full color/grayscale distribution mode is conveyed as the image quality mode by the receiving unit 511, the gradation processing unit 305 outputs the magnification-altered image data (the image data expressed by multivalued (gradient) image) because in the table shown in FIG. 4, the gradation process associated with the image quality mode is not plain binarization (but is multivalued (gradient) image output). Because the image data expressed by the multivalued (gradient) image is stored in the HDD 105 by the first image-data processing device 102, the image data is output without being subjected to any gradation process in the monochromatic two-value (picture mode) or the full color/grayscale distribution mode.

Once the second image-data processing device 104 performs image processing on the image data, the display unit 513 displays the image data as a preview image on the LCD of the control/display device 110 (or the screen of the PC 116).

Figure 7:
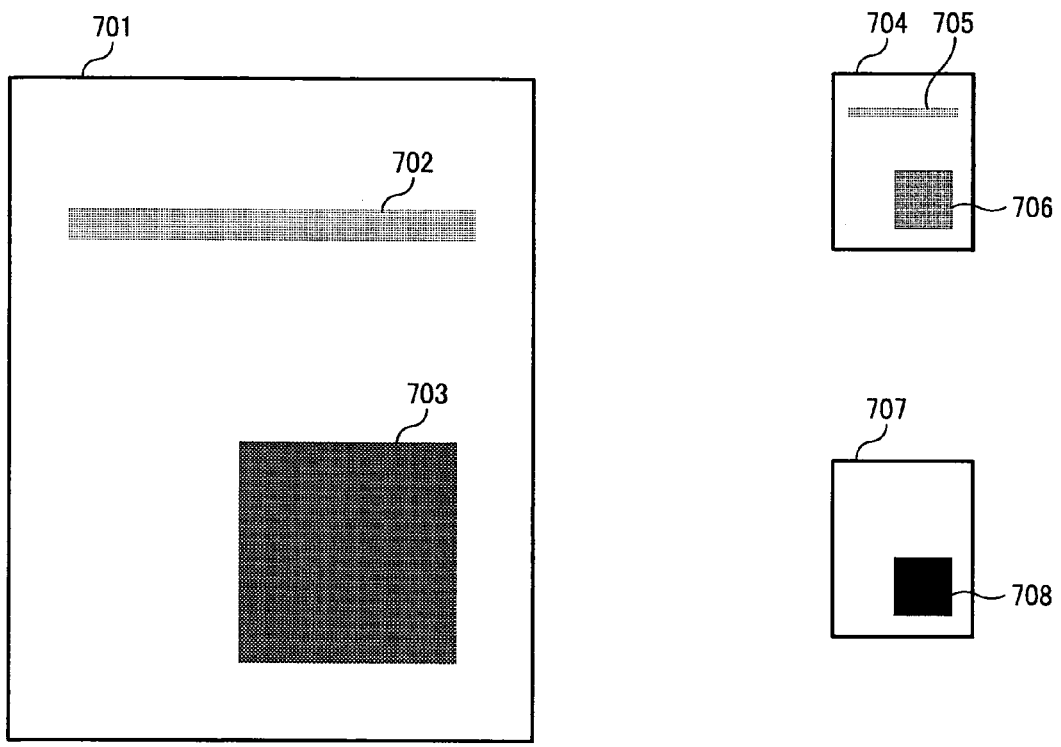
FIG. 7 depicts examples of low-magnification preview images.

FIG. 7 depicts examples of low-magnification preview images. The reference numeral 701 represents an image that is created from image data stored in the HDD 105 and it includes a low-density line 702, and a medium-density area 703 that is denser than the line 702.

The reference numeral 704 represents a preview image of the image data 701 in full color/grayscale distribution mode or monochromatic two-value (picture mode).

If full color/grayscale distribution mode is specified as the image quality mode, the second image-data processing device 104 outputs an image data whose resolution is altered to a resolution of the preview magnification (for example, 25%) (that is, an image data expressed by multivalued (gradient) image). Thus, the preview image 704 displayed on the LCD of the control/display device 110 (or the screen of the PC 116) will be 25% the size of the image data 701 and will have the same gradient as the output image data.

If monochromatic two-value (picture mode) is specified as the image quality mode, the second image-data processing device 104 outputs an image data whose magnification is altered to the resolution of the preview magnification (for example, 25%) (that is, an image data expressed by multivalued (gradient) image). Thus, the preview image 704 displayed on the LCD of the control/display device 110 (or the screen of the PC 116) will be 25% the size of the image data 701. The preview image 704 includes a low-density line 705 as well as a medium-density figure 706, similar to the output image data.

If monochromatic two-value (text mode) is specified as the image quality mode, the second image-data processing device 104 subjects the image data to plain binarization and alters the resolution of the image data to the preview magnification (for example, 25%). Thus, a preview image (denoted by reference numeral 707 in FIG. 7) will be displayed in which the medium-density figure 706 is altered to a high-density figure 708.

In other words, if a low-magnification preview is specified, it is sufficient for the preview image, small as it is, to give a rough idea about the image data. To create such a preview image data, the second image-data processing device 104 changes the gradation process performed on the image data based on the preview magnification and the image quality mode. For example, the second image-data processing device 104 displays the preview image of the image data, which will be subjected to a pseudo halftone process such as the error diffusion process or the dither process at output, in the gradient which is equivalent to the gradient of a multivalued (gradient) image. Similarly, the second image-data processing device 104 displays the preview image of the image data, which will be subjected to plain binarization at output, in the gradient which is like the image that has been subjected to plain binarization. In other words, if a low-magnification preview is specified, the preview image is displayed as a multivalued (gradient) image or a plain binarized image.

The magnification altering process performed by the magnification altering unit 303 when a high-magnification preview is specified is explained next.

If the preview magnification conveyed by the receiving unit 511 is higher than the preset magnification (No at Step S601), the magnification altering unit 303 alters the magnification of the image data to an output resolution of the image data (Step S605). In other words, the magnification altering unit 303 alters a magnification process of the image data based on whether the preview magnification is lower than a preset magnification. For example, if the output resolution of the image data is 300 dpi, and the resolution of the image data stored in the HDD 105 is 600 dpi, the magnification altering unit 303 alters the magnification of the image data stored in the HDD 105 to 300 dpi. If a high-magnification preview is specified, the image data, which has already been altered to the output resolution, is further subjected to a gradation process. Thus, the preview image data created has an image quality that is more like the output image data.

If the preview magnification conveyed by the receiving unit 511 is higher than the preset magnification (that is, if a high-magnification preview is specified), the gradation processing unit 305 subjects the image data to the same gradation process as the image data is subjected to at output (that is, the gradation process based on the image quality mode conveyed by the receiving unit 511) (Step S606). According to the embodiment, the gradation processing unit 305 subjects the image data to the gradation processes (the gradation processes of the high-magnification preview image) to which the output image is subjected stored in an associated form with the image quality modes conveyed by the receiving unit 511 in the table shown in FIG. 4.

For example, if full color/grayscale distribution mode is conveyed as the image quality mode by the receiving unit 511, the gradation processing unit 305 outputs an image data expressed by the same gradation process performed on the image data at output. The gradation processing unit 305 outputs the image data without performing any gradation process on the image data because the image data stored in the HDD 105 are multivalued (gradient) images. If monochromatic two-value (text mode) is conveyed as the image quality mode by the receiving unit 511, the gradation processing unit 305 subjects the image data to plain binarization similar to the gradation process performed on the output image data.

If the preview magnification is higher than the preset magnification, the magnification altering unit 512 alters the magnification of the image data that has been subjected to the gradation process by the gradation processing unit 305 to a resolution of the preview magnification (resolution of the preview image) conveyed by the receiving unit 511 (Step S607). If the preview magnification conveyed by the receiving unit 511 is 200%, the magnification altering unit 512 alters the magnification of the image data to 1200 dpi (600× 200%), because the magnification of the image data is altered to a resolution of 300 dpi at Step S605.

Thus, if a high-magnification preview is specified, first the magnification altering unit 303 alters the magnification of the image data to resolution of the output image data, and then the magnification altering unit 512 alters the resolution of the image data to the preview magnification. Because of this, the process of altering the preview magnification of a high-magnification image takes longer than that of a low-magnification image.

However, because the image data is altered to the resolution of the output image data and the gradation process is performed on the altered image data, when a high-magnification preview is specified, the preview image is more like the output image data not only due to the gradient but also because of text reproduction. If a low-magnification preview is specified, the process takes less time because there is no magnification altering process by the magnification altering unit 512.

The display unit 513 displays the magnification-altered image data as a preview image on the LCD of the control/display device 110 (or the screen of the PC 116).

FIG. 8 depicts examples of high-magnification preview images. The reference numeral 801 represents an image created from image data stored in the HDD 105 that includes a low-density line 802, and a medium-density area 803 that is denser than the line 802.

The reference numeral 804 represents an example of a preview image of the image 801 in full color/grayscale distribution mode. If full color/grayscale distribution mode is specified as the image quality mode, the second image-data processing device 104 outputs an image data whose resolution is altered to a resolution of the preview magnification (for example, 100%) (that is, an image data expressed by a multivalued (gradient) image). Thus, the preview image 804 displayed on the LCD of the control/display device 110 (or the screen of the PC 116) will be of the same gradation and resolution as the output image data. The preview image 804 will include a low-density line 805 as well as a medium-density area 806, similar to the output image data.

The reference numeral 807 represents a preview image of the image data 801 in monochromatic two-value (picture mode). In this case, the second image-data processing device 104 subjects the image data to the error diffusion/dither process (pseudo halftone process), and alters the magnification of the image data to the preview resolution (for example, 100%). Thus, the image displayed on the LCD of the control/display device 110 (or the screen of the PC 116) will have the same gradient and resolution as the output image data. Similar to the output image data, the preview image 807 will have a low-density line 808 as well as a medium-density area 809, shown only by white dots and black dots.

The reference numeral 810 represents a preview image of the image 801 in monochromatic two-value (text mode). In this case, the second image-data processing device 104 subjects the image data to plain binarization, and alters the magnification of the image data to the resolution of the preview magnification (for example, 100%). Thus, the image displayed on the LCD of the control/display device 110 (or the screen of the PC 116) will have the same gradient and resolution as the output image data. The preview image 810 will be displayed in which the medium-density area 803 is altered to a high-density figure 811.

In other words, when a high-magnification preview is specified, the image quality should preferably be the same as that of the output image data so that details like a break in the low-density line are reproduced. Therefore, the second image-data processing device 104 subjects the image data to a gradation process based on the image quality conveyed by the receiving unit 511. The LCD displays only a part of the preview image when the preview image size is too large to fit in the LCD. In such as case, a scroll function can be used to scroll the preview image.

The CPU 106 can execute the computer program stored in the ROM 114 to realize the image processing performed by the second image-data processing device 104. In this case, the error diffusion process will take a longer time. However, preview image is displayed much faster for low-magnification preview than for high-magnification preview because the error diffusion process is not performed in the preview-image creation process.

If the image data is to be output to the plotter device 109 for outputting as a printout on a printing paper, the gradation processing unit 305 can always perform a gradation process to output a multivalued (gradient) image, regardless of what the magnification altering unit 303 determines. The reason for this is that the preview image displayed on the LCD of the control/display device 110 and the printout from the plotter device 109 are radically different in appearance.

Thus, when creating a preview image based on the image data, the MFP 100 subjects the image data to a magnification process as well as a gradation process based on the image quality when the preview magnification is lower than a preset magnification and the gradation process based on the image quality is plain binarization, as well as if the preview magnification is higher than the preset magnification. As a result, the MFP 100 creates a preview image that looks similar to the output image data, enabling the user to get an idea about the output image data from the preview image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an output unit that outputs gradation-processed image data that has been subjected to a gradation process based on preset image quality mode;
   a receiving unit that receives a display request for displaying a preview image of the gradation-processed image data to be output from the output unit, and a preview magnification indicative of a display magnification of the preview image;
   an image processing unit that performs a first magnification-altering process on the gradation-processed image data output from the output unit thereby obtaining magnification-altered image data and performs on the magnification-altered image data the gradation process based on the image quality mode if the preview magnification is lower than a present magnification and the gradation process based on the image quality mode is such that the gradation-processed image data does not express halftone, as well as if the preview magnification is higher than the present magnification thereby obtaining processed image data; and
   a display unit that creates and displays the preview image based on the processed image data.

2. The image processing apparatus according to claim 1, wherein the image processing unit
   performs the gradation process on the magnification-altered image data based on the image quality mode if the preview magnification is lower than the certain magnification and the gradation process based on the image quality mode is plain binarization and obtains the processed image data, and
   obtains the magnification-altered image data expressed by a multivalued gradient image as the processed image data if the preview magnification is lower than the certain magnification and the gradation process based on the image quality mode is not plain binarization.

3. The image processing apparatus according to claim 1, further comprising a magnification altering unit that performs a second magnification-altering process on the processed image data according to the preview magnification, wherein
   if the preview magnification is higher than the certain magnification, the image processing unit performs the first magnification-altering process on the gradation-processed image data according to the magnification thereof at output and then performs the gradation process.

4. The image processing apparatus according to claim 3, wherein, if the preview magnification is lower than the certain magnification, the image processing unit performs the first magnification-altering process on the gradation-processed image data according to the preview magnification and then performs the gradation process.

5. The image processing apparatus according to claim 1, wherein the receiving unit receives designation of the certain magnification.

6. The image processing apparatus according to claim 1, wherein, if the gradation-processed image data is to be output as a printout on a printing medium, the image processing unit outputs the magnification-altered image data expressed by a multivalued gradient image, regardless of the preview magnification.

7. An image processing method comprising:
   outputting gradation-processed image data that has been subjected to a gradation process based on preset image quality mode;
   receiving a display request for displaying a preview image of the gradation-processed image data to be output from the output unit, and a preview magnification indicative of a display magnification of the preview image;
   first performing including performing a first magnification-altering process on the gradation-processed image data output at the outputting thereby obtaining magnification-altered image data, and performing on the magnification-altered image data the gradation process based on the image quality mode if the preview magnification is lower than a present magnification and the gradation process based on the image quality mode is such that the gradation-processed image data does not express halftone, as well as if the preview magnification is higher than the present magnification thereby obtaining processed image data; and
   creating and displaying the preview image based on the processed image data.

8. The image processing method according to claim 7, wherein the first performing includes
   performing the gradation process on the magnification-altered image data based on the image quality mode if the preview magnification is lower than the certain magnification and the gradation process based on the image quality mode is plain binarization and obtains the processed image data, and
   obtaining the magnification-altered image data expressed by a multivalued gradient image as the processed image data if the preview magnification is lower than the certain magnification and the gradation process based on the image quality mode is not plain binarization.

9. The image processing method according to claim 7, further comprising second performing including performing a second magnification-altering process on the processed image data according to the preview magnification, wherein
   if the preview magnification is higher than the certain magnification, the first performing includes performing the first magnification-altering process on the gradation-processed image data according to the magnification thereof at output and then performing the gradation process.

10. The image processing method according to claim 9, wherein, if the preview magnification is lower than the certain magnification, the first performing includes performing the first magnification-altering process on the gradation-processed image data according to the preview magnification and then performing the gradation process.

11. The image processing method according to claim 7, wherein the receiving includes receiving designation of the certain magnification.

12. The image processing method according to claim 7, wherein, if the gradation-processed image data is to be output as a printout on a printing medium, the first performing includes outputting the magnification-altered image data expressed by a multivalued gradient image, regardless of the preview magnification.

13. A a non-transitory computer program product that includes a computer program stored on a computer-readable storage medium which when executed on a computer causes the computer to execute:

outputting gradation-processed image data that has been subjected to a gradation process based on preset image quality mode;

receiving a display request for displaying a preview image of the gradation-processed image data to be output from the output unit, and a preview magnification indicative of a display magnification of the preview image;

first performing including performing a first magnification-altering process on the gradation-processed image data output at the outputting thereby obtaining magnification-altered image data, and performing on the magnification-altered image data the gradation process based on the image quality mode if the preview magnification is lower than a present magnification and the gradation process based on the image quality mode is such that the gradation-processed image data does not express halftone, as well as if the preview magnification is higher than the present magnification thereby obtaining processed image data; and creating and displaying the preview image based on the processed image data.

14. The computer program product according to claim 13, wherein the first performing includes performing the gradation process on the magnification-altered image data based on the image quality mode if the preview magnification is lower than the certain magnification and the gradation process based on the image quality mode is plain binarization and obtains the processed image data, and obtaining the magnification-altered image data expressed by a multivalued gradient image as the processed image data if the preview magnification is lower than the certain magnification and the gradation process based on the image quality mode is not plain binarization.

15. The computer program product according to claim 13, wherein the computer program further causes the computer to execute second performing including performing a second magnification-altering process on the processed image data according to the preview magnification, wherein if the preview magnification is higher than the certain magnification, the first performing includes performing the first magnification-altering process on the gradation-processed image data according to the magnification thereof at output and then performing the gradation process.

16. The computer program product according to claim 15, wherein, if the preview magnification is lower than the certain magnification, the first performing includes performing the first magnification-altering process on the gradation-processed image data according to the preview magnification and then performing the gradation process.

17. The computer program product according to claim 13, wherein the receiving includes receiving designation of the certain magnification.

18. The computer program product according to claim 13, wherein, if the gradation-processed image data is to be output as a printout on a printing medium, the first performing includes outputting the magnification-altered image data expressed by a multivalued gradient image, regardless of the preview magnification.

* * * * *